(12) United States Patent
Ryan et al.

(10) Patent No.: US 6,950,520 B1
(45) Date of Patent: Sep. 27, 2005

(54) METHOD AND APPARATUS FOR CARRYING DATA IN A VIDEO SIGNAL SO THAT THE DATA IS NOT RECORDED

(75) Inventors: John O. Ryan, Woodside, CA (US); James R. Holzgrafe, Morgan Hill, CA (US); Mark A. Hollar, Palo Alto, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/490,836

(22) Filed: Jan. 25, 2000

Related U.S. Application Data

(60) Provisional application No. 60/117,273, filed on Jan. 26, 1999.

(51) Int. Cl.$^7$ .............................. H04L 9/00; H04L 1/00
(52) U.S. Cl. ...................... 380/200; 380/278; 380/287
(58) Field of Search ............................... 380/221, 239, 380/226, 270, 210, 200, 201; 725/712, 348, 725/383; 386/12, 34, 84, 124

(56) References Cited

U.S. PATENT DOCUMENTS

| | | | | |
|---|---|---|---|---|
| 3,852,519 A | * | 12/1974 | Court .......................... | 380/219 |
| 3,963,865 A | * | 6/1976 | Songer ....................... | 380/204 |
| 4,100,575 A | * | 7/1978 | Morio et al. ................ | 380/204 |
| 4,390,898 A | * | 6/1983 | Bond et al. ................. | 380/214 |
| 4,849,836 A | * | 7/1989 | Kachikian .................... | 360/60 |
| 4,964,162 A | * | 10/1990 | McAdam et al. ........... | 380/215 |
| 5,410,601 A | * | 4/1995 | Hashimoto .................. | 380/215 |
| 5,438,620 A | | 8/1995 | Ryan et al. ................... | 380/15 |
| RE35,078 E | | 10/1995 | Ryan ........................... | 380/11 |
| 5,579,390 A | | 11/1996 | Ryan et al. ................... | 380/11 |
| 5,608,799 A | | 3/1997 | Ryan et al. ................... | 380/11 |
| 5,627,655 A | | 5/1997 | Okamoto et al. ............. | 386/94 |
| 5,666,168 A | * | 9/1997 | Montgomery et al. ...... | 348/473 |
| 5,778,140 A | | 7/1998 | Okamoto et al. ............. | 386/94 |
| 5,841,863 A | | 11/1998 | Ryan et al. ................... | 380/11 |
| 5,844,988 A | | 12/1998 | Ryan et al. ................... | 380/11 |
| 6,357,046 B1 | * | 3/2002 | Thompson et al. ......... | 725/139 |

FOREIGN PATENT DOCUMENTS

| | | |
|---|---|---|
| EP | 0 843 472 | 5/1998 |
| JP | 06-054289 | 2/1994 |
| WO | WO 89/10664 | 11/1989 |
| WO | WO 98/34401 | 8/1998 |

OTHER PUBLICATIONS

Schneier, Bruce, "Applied Cryptography," 1996, John Wiley and Sons, 2$^{nd}$ edition, p. 176.*

* cited by examiner

*Primary Examiner*—Frantz Coby
*Assistant Examiner*—Patrick Santos
(74) *Attorney, Agent, or Firm*—Morrison & Foerster LLP

(57) ABSTRACT

A method and apparatus for modifying a video signal to allow it to carry encoded data which is detectable at a suitably compliant receiver but is not recorded by a conventional video recorder. One application is to carry a descrambling key to prevent useful recording (but not viewing) of a scrambled television signal since the key will not be recorded. This encoded "hidden" data is not recorded by the conventional video recorders because, for instance, it is located in the vertical or horizontal blanking intervals of the video signal, or is carried by a high frequency carrier signal, or is expressed by phase modulation of the video signal's synchronization pulses.

12 Claims, 6 Drawing Sheets

METHOD AND APPARATUS FOR CARRYING DATA IN A VIDEO SIGNAL SO THAT THE DATA IS NOT RECORDED

CROSS REFERENCE TO RELATED APPLICATION

This application claims priority to U.S. provisional Ser. No. 60/117,273 filed Jan. 26, 1999, incorporated herein by reference in its entirety.

FIELD OF THE INVENTION

This disclosure relates to video and more specifically, to carrying data with a video signal so the data is not recorded by standard video recorders.

BACKGROUND

The present inventors have recognized that it is desirable to have the ability to modify video signals so they carry additional information (data) which can be received and used by a receiving device (e.g., a TV set or display device but which, for security reasons, is not recordable by standard video recorders. It is believed that this problem of video data conveyance without recordability has not been earlier recognized. For instance, the VBI (vertical blanking interval) of video signals is often used to carry (non-video) data such as closed captioning, but a standard VHS type VCR does record the VBI and also this data. However, current digital video recorders do not record the VBI, and it is believed that future digital recorders may record only, for instance, part of the amplitude of the VBI.

SUMMARY

There is disclosed here how to place data in that part of video signals which will generally survive transmission to a receiving device (e.g., transmission across a coaxial cable) but which will not be recorded by certain classes of current or standard video recording or storage devices. The data is used by non-recording devices, such as a compliant (compatible) TV set, for instance, for control or descrambling of the video signal. This approach is not limited to any particular video or TV standards.

DETAILED DESCRIPTION

Certain video (e.g., television) systems, including scrambling systems, pass data, either in the clear or encrypted, in the vertical blanking interval of the video signal. (This data is usually not a part of the video image or necessary for the video image.) For an example, see commonly owned U.S. patent to Ryan, et al., "Method and Apparatus for Scrambling a High Definition Television Signal," U.S. Pat. No. 6,542,609, issued Apr. 1, 2003, incorporated herein by reference in its entirety.

Systems using encryption in this case rely on the receiving device to have a unique key decryption technique. In applications with consumer electronic equipment, management of these keys for a large number of devices causes significant cost to be incurred. In many cases, a system with lower, but sufficient, security could be created with a small number of reused keys.

Figure 1A:
FIG. 1A shows a generic system for play of scrambled analog video.

To provide benefit to the copyright holder (this refers to the copyright on the video content), it may be desirable to discourage recording of certain types of video content from a video player or set top box. FIG. 1A shows the desirable connection where video player or cable-TV set top box 14 scrambles its output video and provides the descrambling key while compliant display (TV set) device 18 descrambles the video for display.

Figure 1B:
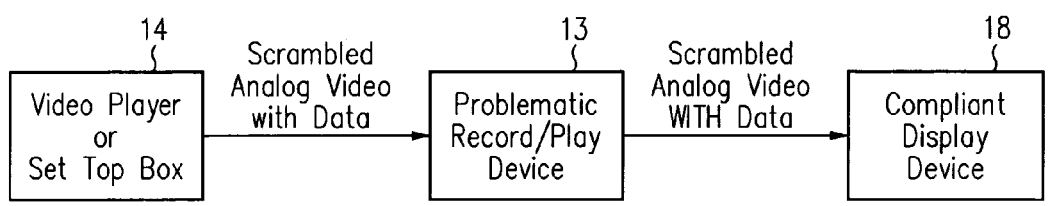
FIG. 1B shows the generic system of FIG. 1A with recording which demonstrates the technical problem of problematic record/play devices.

As shown in related FIG. 1B, without the present method, while device 14 can scramble the video, the video can still be recorded and additional copies made using multiple record/play devices (such as device 13). Each of these copies can be played on (recorder) device 13 and viewed on display device 18. This is undesirable from the copyright holder's viewpoint and is activity which the present method discourages. In FIG. 1B, non-compliant (problematic) devices such as device 13 record the video and its vertical and/or horizontal blanking intervals. By recording the entire video stream including the descrambling keys designated in FIG. 1A as "scrambled analog video with data", device 13 is problematic to the copyright holder. The resulting video recording would then still be playable on a non-compliant (problematic) playback device 13 (a video recorder) and the played signal, shown in FIG. 1B as "scrambled video with data", would still be viewable on a compliant display device 18 as shown in FIG. 1B.

Hence this disclosure is directed to methods and apparatuses for concealing or hiding data (such as decryption or descrambling keys) in a video signal so that the hidden data is not recorded by such a problematic standard (non-compliant) video recorder. That is, only special (compliant) video receivers or recorders can extract and use the hidden data. This approach is not limited to high definition television (HDTV), as disclosed in the above-referenced co-pending application, but generally applies to situations using analog video transmission with digital video storage/recording. The method (in that co-pending application) for high definition television in which an indicator of the amount of wobble (active video time shifting for scrambling) is conveyed as hidden data by shifting in a predetermined fashion a location (in time) of an edge of a sync pulse is one example of this approach. The shifted sync pulse edge position represents an encoded version of the "hidden" data.

More generally, this approach is useful when it is desired to control use (e.g., recording or display) of the video signal upon receipt, and especially where the intent is that the control data (which is the "hidden" data) itself is not readily recordable by a problematic (non-compliant) standard video recorder.

Figure 1C:
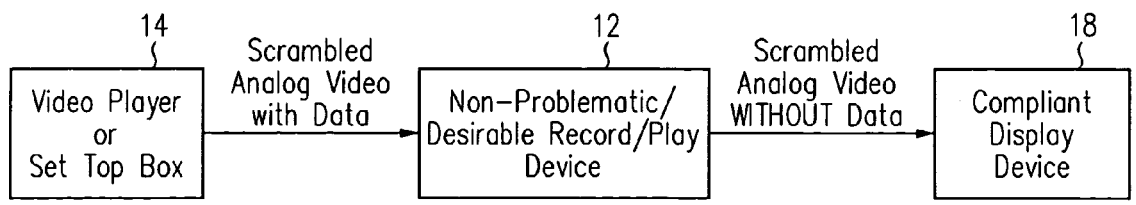
FIG. 1C shows a non-problematic recording system.

As shown in FIG. 1C (similar to FIG. 1B), many types of current standard NTSC and PAL video record/play devices 12 blank the vertical and horizontal blanking intervals of a scrambled analog video signal output from a compliant video player or set top box (source) 14. This has the advantage of automatically thereby removing any associated hidden data located in the blanking interval. In the case shown in FIG. 1C, the scrambled analog video without scrambling data transmitted from the non-problematic record/play device (recorder) 12 to the display device 18 (TV set) is thereby unable to be descrambled. This is because the act of recording by device 12 removes the hidden data, which is the descrambling key. The goal of preventing recording has now been achieved.

Thus FIG. 1C shows generally the intended result in accordance with this disclosure—that the "hidden" data in the scrambled analog video is not recorded, so any recording of that video results in a video signal that then cannot be descrambled, due to lack of the essential descrambling key which was not recorded. This in effect prevents unauthorized recording. A problematic recording device 13 as in FIG. 1B in contrast, if available, would record the hidden data and thereby pass it along to the display device 18 upon playback.

Other suitable data hiding methods (in addition to placement in the blanking intervals) include (1) use of a high frequency carrier that is within the transmission bandwidth of the video cable but is outside the bandwidth of the recording device; and (2) phase modulation of the video signal's synchronization pulses, as described in the above-referenced copending application. Versions of all of the above methods may be applied to a chrominance signal as well as a luminance signal.

For high definition television as opposed to NTSC/PAL video, the above-described use of any part of the blanking intervals to hide the data method may be inadequate since high definition video recorders have yet to be made commercially available. These recorders may be newly designed to record the active picture area and also the horizontal and vertical blanking intervals; this would include any conventionally encoded data in the vertical blanking intervals. These types of recorders may, for instance, record that part of the video signal (including blanking intervals) which goes from blanking (or black) level to peak white level, with some margin for overshoots. For instance, the CCIR-601 standard defines an 8-bit number system for carrying a digital component video signal in which the black level is represented by level 16 of 256 possible levels ($10_{hex}$) and white is represented by level 235 ($EB_{hex}$). In this case, levels from 1 to 254 ($01_{hex}$ to $FF_{hex}$) are considered legal while levels 0 and 255 ($00_{hex}$ and $FF_{hex}$) are reserved for the transmission of synchronization words.

Figure 2:
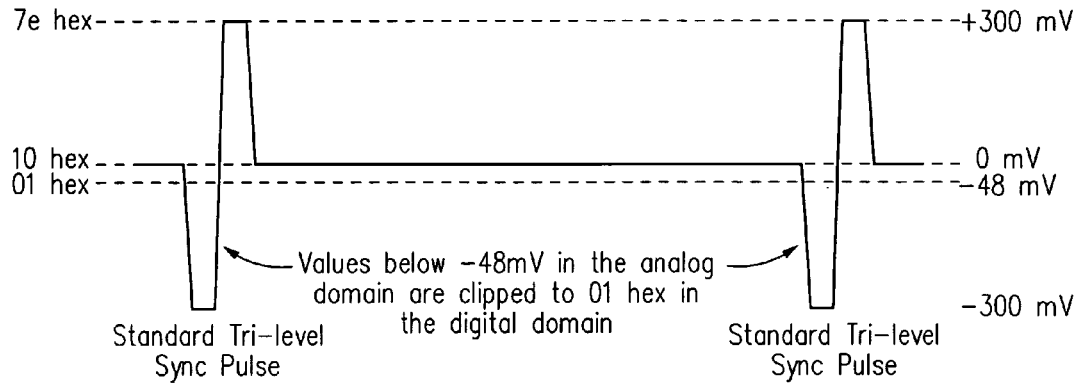
FIG. 2 shows a prior art video waveform.

An analog representation of such a conventional (prior art) high definition video signal waveform is shown in FIG. 2 with the associated voltage levels indicated both as voltages (right margin) and as digital values (left margin). FIG. 2 shows one video line (with no actual picture information) and the beginning of the next video line, thereby including two horizontal sync pulses.

One method for accomplishing the present data placement which would be operative with such standard video recorders is to locate the data signals in a part (in terms of amplitude) of the video signal which is generally reserved for the synchronization (sync) pulses, i.e., from blanking or black level down to the sync tip level. This is outside the amplitude range recorded by the above-described potential HD video recorders. For instance, a PAL video signal having blanking at 0 volts has sync tip at −300 millivolts. Or, for instance a 525 progressive, 720 progressive, 1080 interlaced or 1080 progressive analog component video signal (HDTV) conforms to the EIA-770 standard where blanking again is at 0V and the sync tips are at −300 mV as shown in FIG. 2. The standard tri-level sync pulses for HDTV are shown in FIG. 2.

This data hiding method is operative because a corresponding digital component video signal (e.g., conforming to CCIR-601, SMPTE 274M, 293M or 296M) is only able to represent those parts of the analog video signal down to approximately −48 mV (01 hex). (This presumes that at some point in the recording device, the video signal is digitized, of course.) Analog video levels below this are clipped when digitized (see FIG. 2) and so must necessarily be represented (in the digital domain) simply as the smallest possible value, 01 hex (8-bit). Thus information in the analog video signal below −48 mV is lost when converted to a CCIR-601 type signal's digital representation.

Thus when this digital component video signal is converted back to analog form, it cannot create a negative going pulse of sufficient amplitude. In most cases, in the digital video domain, it is the responsibility of a special integrated circuit to receive special synchronization words (values) and then to convert those into analog sync pulses with sufficient negative amplitude. Special sequences of $FF_{hex}$ and $00_{hex}$ and an additional byte are often used to indicate the start of a line, field or vertical period or their end. Thus devices which convert the analog video to digital component video for internal recording or processing (e.g., certain video recorders), such as recording device 12 in FIG. 1C would inherently remove any hidden data encoded below the video blanking level. In particular, the data transmitted in this way is not generally available in a digital video format which would be available for manipulation by software. This inaccessibility by software considerably enhances a scrambling system.

Figure 3:
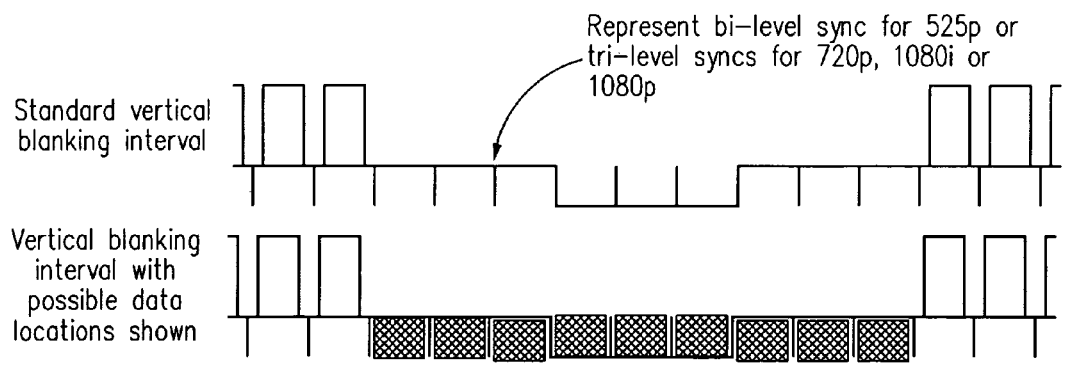
FIG. 3 shows a modified vertical blanking interval (VBI) waveform.

For more detail see FIG. 3 which shows a waveform relating to that of FIG. 2 but showing multiple video lines including (upper part of figure) the vertical blanking interval of a conventional analog component video signal in accordance with the EIA-770.1 HDTV standard. The lower part of FIG. 3 shows (hatching) for that same waveform possible data hiding locations in accordance with this disclosure. The illustrated data hiding locations are all below blanking level and in the VBI. FIG. 3 is for the luminance component of a video signal. The data itself may be encoded in any convenient digital communications format consistent with the general representation shown in FIG. 4. FIG. 3 shows (hatched areas) possible locations in the VBI for the data packets shown in FIG. 4.

Thus FIG. 3 shows (lower part) how the vertical blanking interval is used to place data (hatched areas) that would not be recorded both because it is in the VBI (or HBI) and because it is below the blanking level. Some digital recorders reproduce the VBI, but none reproduce below blanking level.

Figure 4:
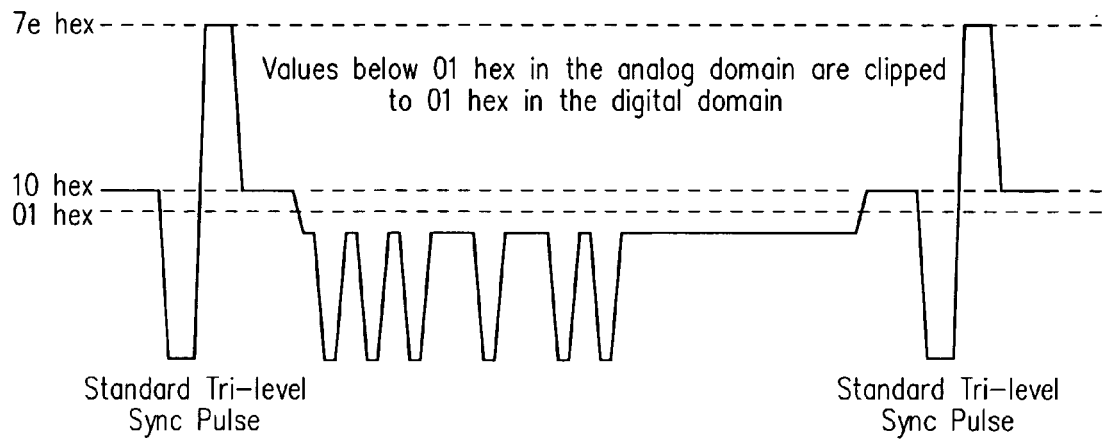
FIG. 4 shows another modified VBI waveform.

FIG. 4 shows an example of the conventional FIG. 2 video line with data added in accordance with this disclosure and thus corresponds to one of the hatched areas in FIG. 3 with the proceeding and following sync pulses. In this case the line is in the VBI (see FIG. 3), and an example representing an 8-bit hidden data "payload" having the value of 0001 0100 (in binary) is shown as being alterations to the usual horizontal sync pulses present in this line of the VBI. Note that the digital representation of this line includes some values at the following hex values: 10, samples ramping down to 01, the remainder of the line at 01, samples ramping up to 10, 10. The analog signal levels below the digitization threshold (01 hex here) are clipped when digitized. The clipped values of course are thereby removed (not recorded by a standard recorder which carries out the digitizing).

Figure 5:
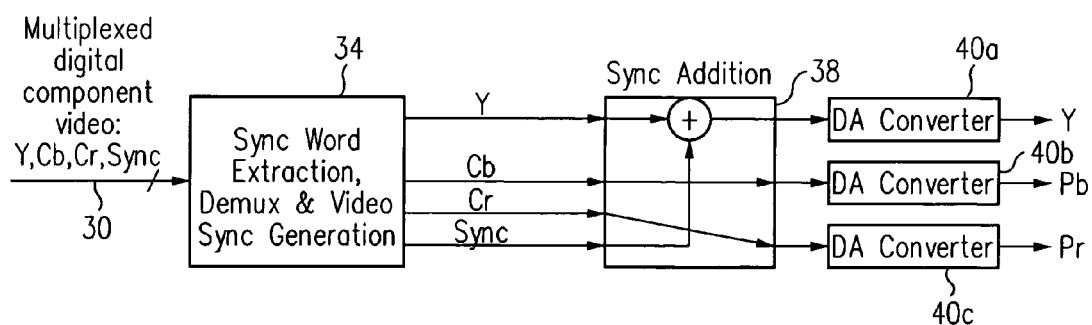
FIG. 5 shows a conventional video encoder.

FIG. 5 shows a block diagram of a conventional video encoder which may be an IC (integrated circuit) that converts Y, Cb, Cr, and sync multiplexed component video to Y, Pb, Cr component video. Such an encoder is used in a cable TV set top box or a video recorder. In some cases, these IC's have 6 digital-to-analog converters: composite (NTSC or PAL), S-Video (luminance and chrominance) and component video (Y/Pb/Pr or GBR). FIG. 5 shows a three component DAC (having digital-analog converters 40a, 40b, 40c) version.

The FIG. 5 digital encoder includes an illustrative input multiplexed component video bus 30 carrying the Y, Cb, Cr, and sync video components to the input port of demultiplexer and video sync generation circuit 34. The resulting output component video from demultiplexer 34 is subject to sync processor 38 which adds the sync component into the Y component. The resulting Y, Cb, Cr components are converted back to analog video components Y, Pb, Pr by respectively digital to analog converters 40a, 40b and 40c.

Figure 6:
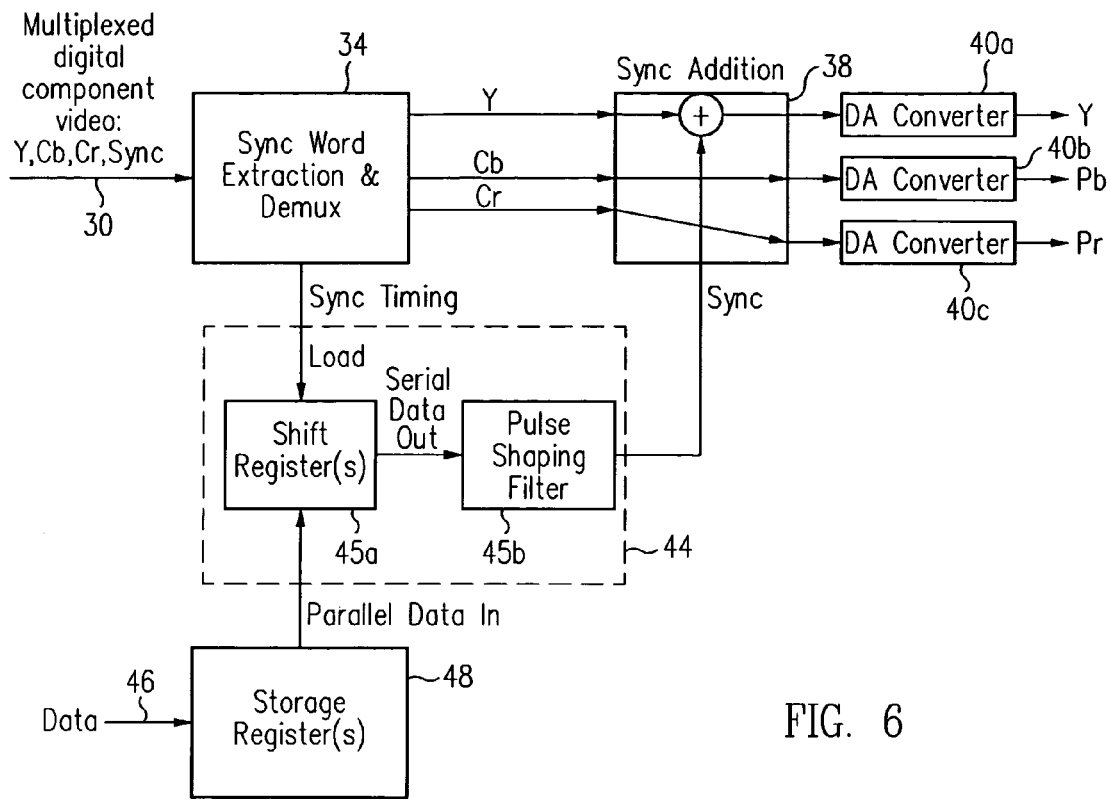
FIG. 6 shows a modified video encoder.

FIG. 6 shows a modified version of the FIG. 5 encoder with the functionality to add the encoded data as additional sync pulses in the VBI as shown in FIG. 4. The FIG. 6 encoder additionally includes a timing and video sync generation circuit 44. Circuit 44 includes shift registers 45a supplying serial data to the input terminal of a pulse shaping filter 45b. Circuit 44 in turn is coupled to data registers (memory) 48 which receives the data to be hidden on its input port 46, for insertion into the VBI portion of the video signal.

The complementary decoder (installed, for instance, in a compliant display device 18 in FIG. 1C) receives the modified video signal transmitted from the FIG. 6 encoder, extracts the added data signal, and separately supplies the video and the extracted data to, e.g., a descrambler, where the extracted data is used as the descrambling key.

Figure 7A:
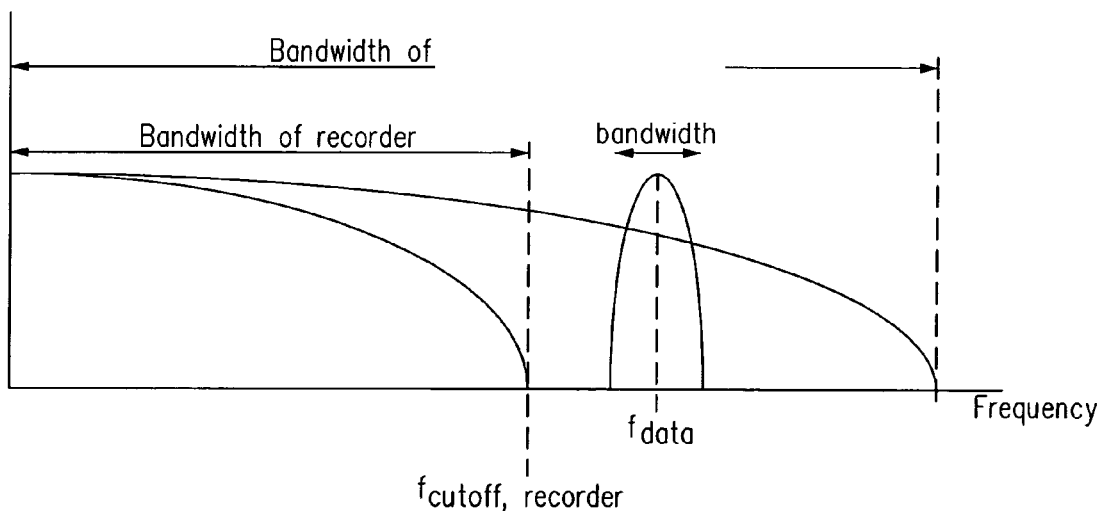
FIG. 7A shows a frequency spectrum for data placement.

The above-mentioned alternative method of placing data in a video signal using a high frequency carrier to "hide" the data can be understood with reference to FIG. 7A. In general, video recorders either use sampling of the video before recording or have some limited bandwidth over which they are capable of recording analog information. FIG. 7A shows video signal frequency (horizontal axis) vs. signal amplitude (vertical axis). Generally, video transmission media such as coaxial cable has a wider bandwidth than do standard recording devices.

As shown in FIG. 7A, the data is converted to a format in which all of the energy is concentrated in a higher region of the spectrum (indicated in FIG. 7A as $f_{data}$) and transmitted at the high frequency band $f_{data}$ to which the recorder cannot respond (record) because of its inherent data storage limitations. (Storage capacity is always a finite resource which must be conserved.) Thus, this allows for data to be presented to the recorder over the transmission media so the recorder cannot record it. As described above, this is desirable for preventing recording of certain types of hidden data. Clearly, to be useful, a compliant video device, (e.g., a TV set) must be able to respond to the video signal at carrier frequency $f_{data}$, and therefore must include appropriate data demodulators. Suitable demodulator techniques are well known.

Figure 7B:
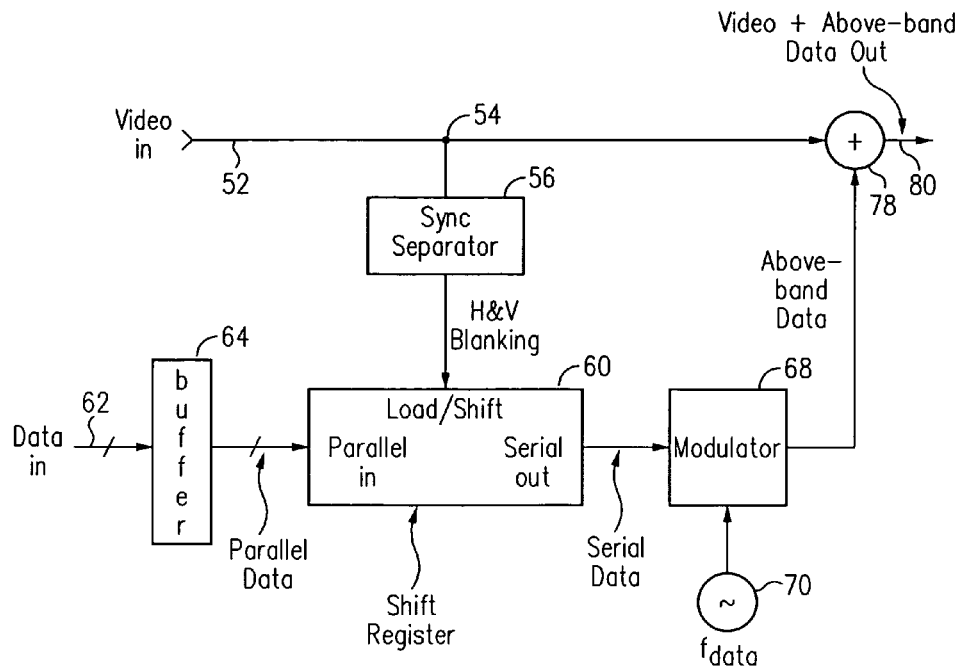
FIGS. 7B and 7C show, respectively, an encoder and decoder to carry out the FIG. 7A method.

FIG. 7B shows such an encoder suitable for carrying out the technique of FIG. 7A. This encoder typically is present in the source device, such as a set top box or video player 14 of the type in FIG. 1C. Incoming video, which is standard video, is applied at terminal 52. Note that this encoder is typically used for each video component where the data is to be inserted. Note that typically the added data would only be applied to one component of the video. Any necessary analog to digital or digital to analog conversion is not shown but is conventional.

The incoming video applied at terminal 52 is coupled at node 54 to conventional sync separator 56. The incoming video at node 54 is also applied to one input terminal of summer 78. The horizontal and vertical separated blanking pulses (in the digital domain) from sync separator 56 are then applied to the load/shift control terminal of conventional shift register 60. At the same time the incoming data (which is, e.g. a descrambling or decryption key), and which is generated externally by any one of a number of the usual methods, is applied as a parallel multi-bit signal to input terminal 62 which is the input terminal to a buffer 64.

The output signal from buffer 64 is then parallel data applied to the parallel in terminal of shift register 60. This input data, in response to the applied horizontal and vertical blanking pulses, is output as serial out data to one input terminal of a modulator 68. The other input terminal of modulator 68 is coupled to an oscillator 70, operating at frequency $f_{data}$. Modulator 68 is any suitable type of modulator, using for instance FM, AM, FSK, PSK, QPSK, etc. The modulated serial data output from modulator 68 is then applied to the other input terminal of summer 78 which outputs the combined input video and the above-band data on its output terminal 80.

Figure 7C:
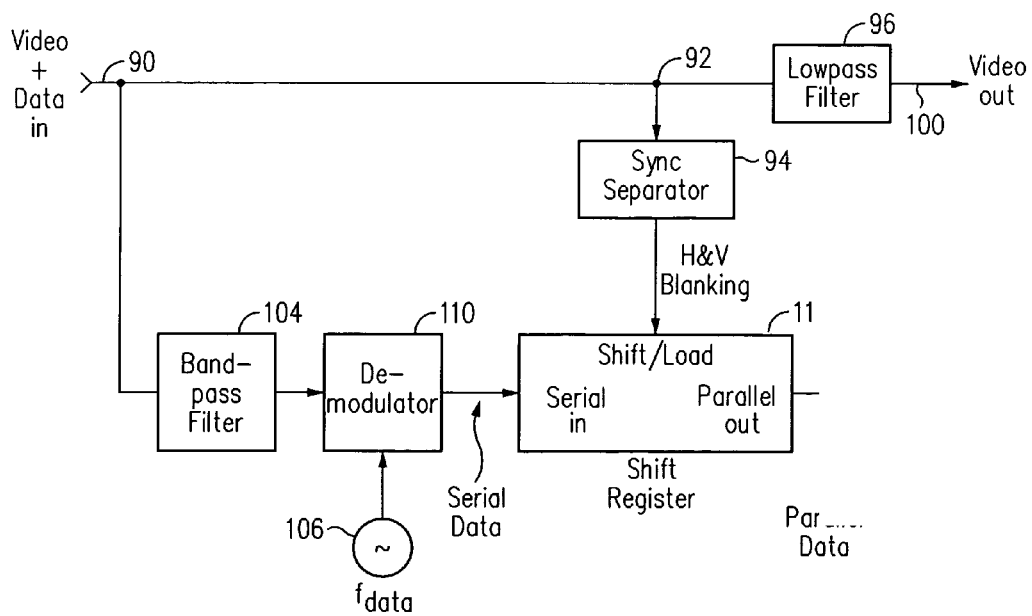

The complementary decoder, which is typically present in a compliant display device (TV set) 18 of the type in FIG. 1C, is shown in FIG. 7C. The input video and data, which is essentially the same signal as output on terminal 80 of the FIG. 7B encoder, is applied at the input terminal 90. This video and data combined signal is then coupled to an optional low pass filter 96 and output as the output video at terminal 100. At the same time the input video at terminal 90 is applied to, at node 92, the input terminal of conventional sync separator 94. Again, any needed analog to digital or digital to analog conversion is not shown but is conventional. The input video is typically only one component of component video, but it is the component carrying the data.

The signals output from the sync separator 94 are the horizontal and vertical blanking pulses applied to the shift/load control terminal of shift register 112. At the same time, the input video and data signal at terminal 90 is applied to the input terminal of band pass filter 104, which outputs the filtered signal to the input terminal of demodulator 110. Demodulator 110 is complementary to modulator 68 in the encoder of FIG. 7B. The other input terminal of demodulator 110 is coupled to an oscillator 106 outputting signals at frequency $f_{data}$, which of course is predetermined to match that of the encoder.

The resulting serial data output from demodulator 110 is applied to the serial input terminal of shift register 112, which then outputs, in response to the control signals applied at its shift/load terminal, the output parallel data to the input terminal of buffer 118. Buffer 118 then outputs the separated output data needed for, e.g., descrambling on its terminal 120. Thus the compliant device has, respectively, the video on terminal 100 and the data (descrambling key) on terminal 120 and is able conventionally to perform the descrambling by whatever algorithm is associated with the scrambling technique.

While the above methods are for the most part modifications to the luminance video signal component, they also apply to the chrominance video signal component. The chroma component (e.g., Cr, Cb) are baseband signals just as is the luma component. As such they can be modified or added to in the same ways as can the luma component. In particular, they contain VBI and HBI portions; while they do not normally include sync pulses as such, nothing says they could not have pulses added. In addition, chrominance components could also have high frequency components added in a manner as shown in FIG. 7A.

Figure 8A:
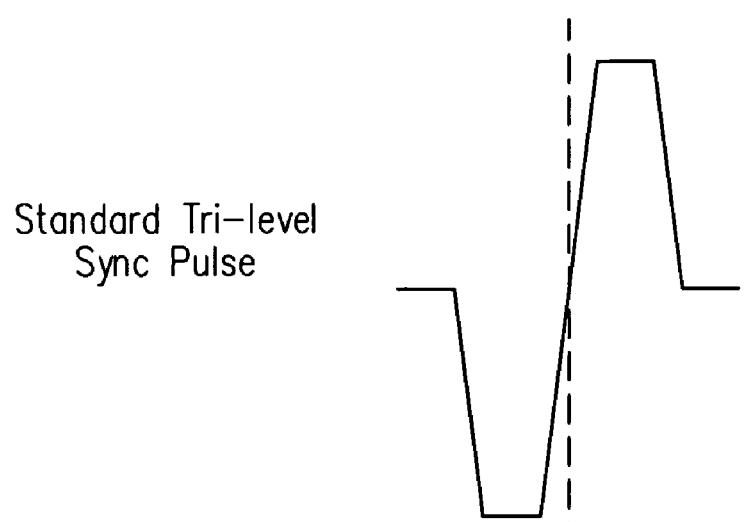
FIGS. 8A, 8B and 8C show sync modulation for data placement.
Figure 8B:
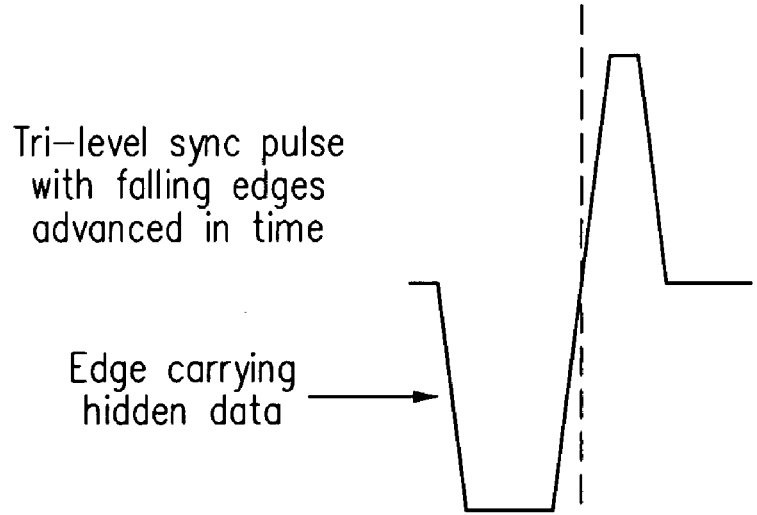
Figure 8C:
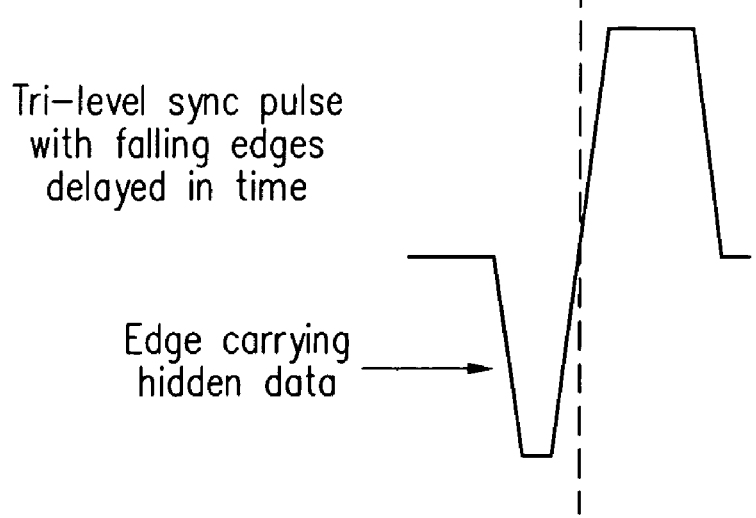

Another method of conveying data in a "hidden" (non-recordable) manner is to modulate the position of the conventional sync pulse edges over time. Most digital video recorders do not record the horizontal synchronization signals; instead, they extract low frequency timing information from them and regenerate and reinsert it upon playback. Creation of a phase modulated synchronization signal allows for information to be conveyed across the transmission media which is not recorded by the recording device. (This is the method of the above-referenced co-pending application of Ryan, et al.) FIG. 8A shows a conventional tri-level sync pulse for HDTV, as also shown in FIG. 2. In FIG. 8B, the sync pulse of FIG. 8A is modified in accordance with this disclosure so that the rising edge of the modified tri-level sync pulse remains in the same nominal position, while the falling edges that precede it and follow it are modulated—advanced in time. Similarly, in FIG. 8C, the two falling edges at the modified sync pulse are delayed in time. A code system of this type can convey, using the modulated edge positions, the descrambling key to a suitable decoder to allow descrambling of the accompanying video signals, or to convey other information, using the differences between these types of sync pulses. That is, the modulated edge positions represent the descrambling key value. This is the sync edge modulation technique disclosed in the above-referenced patent application.

Further modifications will be apparent to one of ordinary skill in the art in light of this disclosure. Therefore, the above description and illustrations should not be construed as limiting the scope of the invention, which is defined by the appended claims.

We claim:

1. A method of transmitting data in a baseband video signal, comprising the acts of:
   providing the data;
   encoding the data;
   modifying a predetermined part of the baseband video signal by inserting therein the encoded data; and
   transmitting the modified signal;
   wherein the predetermined part of the modified video signal is not recorded by particular video recorders, and is in a blanking interval of the video signal.

2. A method of transmitting data in a baseband video signal, comprising the acts of:
   providing the data;
   encoding the data;
   modifying a predetermined part of the baseband video signal by inserting therein the encoded data; and
   transmitting the modified signal;
   wherein the predetermined part of the modified video signal is not recorded by particular video recorders, and wherein the predetermined part is also below a selected voltage level.

3. The method of claim 1, wherein the predetermined part is above a predetermined frequency.

4. A method of receiving data encoded in a modified baseband video signal wherein the data in a predetermined part of the video signal is not recorded by particular video recorders and is in a blanking interval of the video signal or is below a selected voltage level, comprising the acts of:
   receiving the modified baseband video signal;
   transmitting the video portion of the modified signal;
   extracting the encoded data from the modified video signal; and
   decoding the extracted data.

5. An encoder for transmitting data encoded in a baseband video signal, comprising:
   an input video terminal for receiving a baseband video signal;
   an input data terminal for receiving the data;
   a sync separator coupled to the input video terminal;
   encoding circuitry coupled to the data input terminal and the sync separator, thereby to encode the data; and
   a summer coupled to the encoding circuitry and the input video terminal, and outputting the video signal having a predetermined part thereof modified by the encoded data;
   wherein the predetermined part of the modified video signal is not recorded by particular video recorders, and is in a blanking interval of the video signal.

6. An encoder for transmitting data encoded in a baseband video signal, comprising:
   an input video terminal for receiving a baseband video signal;
   an input data terminal for receiving the data;
   a sync separator coupled to the input video terminal;
   encoding circuitry coupled to the data input terminal and the sync separator, thereby to encode the data; and
   a summer coupled to the encoding circuitry and the input video terminal, and outputting the video signal having a predetermined part thereof modified by the encoded data;
   wherein the predetermined part of the modified video signal is not recorded by particular video recorders, and wherein the predetermined part is also below a selected voltage level.

7. The encoder of claim 5, wherein the predetermined part is above a predetermined frequency.

8. A decoder for receiving data in a modified baseband video signal wherein the data is encoded into a predetermined portion of the video signal not recorded by particular video recorders and is in a blanking interval of the video signal or is below a selected voltage level, comprising:
   a video input terminal for receiving the modified baseband video signal;
   a video output terminal coupled to the input terminal;
   extraction circuitry having an input terminal coupled to the video input terminal and which extracts the data from the predetermined portion of the modified video signal; and
   a data output terminal coupled to the extraction circuitry to output the extracted data.

9. The method of claim 1, wherein the data is a key for descrambling or decrypting the video signal.

10. The method of claim 4, wherein the data is a key for descrambling or decrypting the video signal.

11. The encoder of claim 5, wherein the data is a key for descrambling or decrypting the video signal.

12. The decoder of claim 8, wherein the data is a key for descrambling or decrypting the video signal.

* * * * *